United States Patent [19]
Eguchi

[11] Patent Number: 5,982,145
[45] Date of Patent: Nov. 9, 1999

[54] BATTERY PACK UNIT, CONTROL METHOD THEREFOR, ELECTRONIC EQUIPMENT DRIVEN BY POWER SUPPLIED FROM THE SAME BATTERY PACK UNIT, AND RECORDING MEDIUM ON WHICH PROGRAM FOR CONTROLLING THE SAME BATTERY PACK UNIT IS RECORDED

[75] Inventor: Yasuhito Eguchi, Kanagawa, Japan

[73] Assignee: Sony Chemicals Corporation, Tokyo, Japan

[21] Appl. No.: 09/055,743

[22] Filed: Apr. 7, 1998

[30] Foreign Application Priority Data

Apr. 8, 1997 [JP] Japan ................................ 9-089603

[51] Int. Cl.$^6$ ................................ H01M 10/46
[52] U.S. Cl. ................... 320/128; 320/134; 320/136
[58] Field of Search .................... 320/110, 123, 320/127, 130, 132, 134, 136, 128

[56] References Cited

U.S. PATENT DOCUMENTS

5,796,238  8/1998  Hiratsuka et al. ....................... 320/118

*Primary Examiner*—Edward H. Tso
*Attorney, Agent, or Firm*—Hill & Simpson

[57] ABSTRACT

Power is supplied to electronic equipment from a battery pack unit by the control of the battery pack unit. A plurality of battery packs are attached to a personal computer. The battery packs each compare the voltage of the personal computer with the voltage of a battery built in its own battery pack. Upon comparison, charging FETs and discharging FETs provided for the battery packs are independently switched on or off. Accordingly, the battery packs simultaneously supply power to the personal computer.

13 Claims, 8 Drawing Sheets

BATTERY PACK UNIT, CONTROL METHOD THEREFOR, ELECTRONIC EQUIPMENT DRIVEN BY POWER SUPPLIED FROM THE SAME BATTERY PACK UNIT, AND RECORDING MEDIUM ON WHICH PROGRAM FOR CONTROLLING THE SAME BATTERY PACK UNIT IS RECORDED

BACKGROUND OF THE INVENTION

1. Field of the Invention

The present invention generally relates to a battery pack unit, a control method for the battery pack unit, electronic equipment, and recording media. More particularly, the invention relates to a battery pack unit having a plurality of battery packs which is suitably used for supplying power to electronic equipment, such as personal computers. The invention is also concerned with a control method for the above type of battery pack unit, electronic equipment driven by power supplied from the above battery pack unit, and recording media on which a program for controlling the above battery pack unit is recorded.

2. Description of the Related Art

Figure 1:
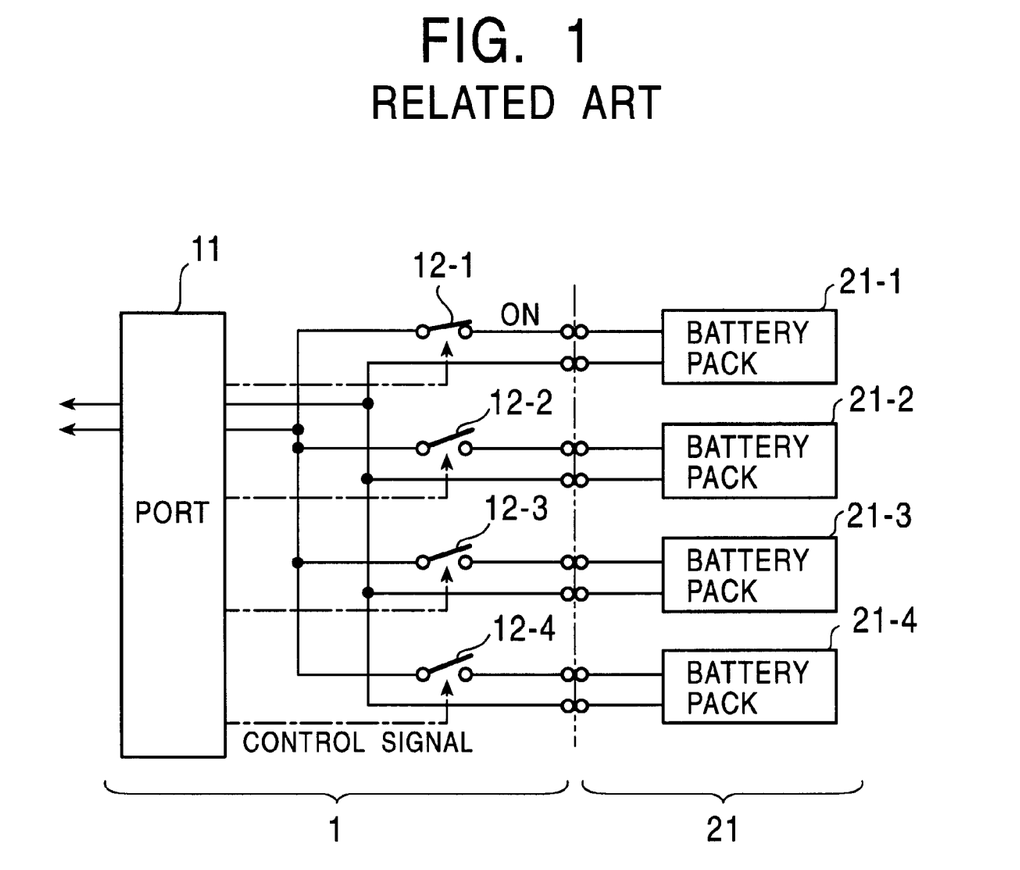
FIG. 1 a block diagram illustrating the connection between a personal computer and a battery pack unit according to an example of related techniques.

FIG. 1 illustrates the configuration in which power is supplied to a personal computer from a battery pack unit according to a technique of the related art. In FIG. 1, a battery pack unit 21, which is formed of four battery packs 21-1 through 21-4, is detachably attached to a personal computer 1.

The personal computer 1 has four switches 12-1 through 12-4, the number of which is the same as the number of battery packs 21-1 through 21-4 attached to the computer 1. One end of each of the switches 12-1 through 12-4 is connected to the positive terminal of each of the battery packs 21-1 through 21-4, respectively. The other ends of the switches 12-1 through 12-4 are connected to each other and are further connected to a port 11. The lines connected to the negative terminals of the battery packs 21-1 through 21-4 are also connected in common to each other within the personal computer 1 and are further connected to the port 11. Moreover, control signals can be individually output to the switches 12-1 through 12-4 from the port 11, thereby separately turning on or off the switches 12-1 through 12-4.

In the state in which the four battery packs 21-1 through 21-4 are connected to the personal computer 1, as discussed above, the personal computer 1 first actuates the switch 12-1 and turns off the other switches 12-2 through 12-4. As a result, power from the battery pack 21-1 is supplied to the individual elements of the personal computer 1 via the port 11.

While the battery pack 21-1 is supplying power, the voltage of the battery pack 21-1 gradually lowers and finally reaches a predetermined reference voltage. Upon detecting the above state, the personal computer 1 turns off the switch 12-1 and turns on the switch 12-2. Then, the battery pack 21-2 starts to supply power.

Similarly, thereafter, every time the voltage of each battery pack reaches a reference voltage, the personal computer 1 sequentially changes the switches 12-1 through 12-4 to obtain power continuously from the battery packs 21-1 through 21-4.

According to the above related art, the provision of the switches 12-1 through 12-4 for the personal computer 1 is necessary to change a plurality of battery packs 21-1 through 21-4. This increases the number of parts and accordingly incurs an increase in the cost. Moreover, the switching devices should be inserted into the power supply path, which generates current loss, resulting in a waste of power.

SUMMARY OF THE INVENTION

Accordingly, in view of the above background, it is an object of the present invention to provide a battery pack unit in which the cost is reduced by decreasing the number of parts and in which the generation of current loss is suppressed.

In order to achieve the above object, according to one aspect of the present invention, there is provided a battery pack unit including a rechargeable battery. A charging switch controls a charging of the battery. A discharging switch controls a discharging of the battery. A control circuit measures a voltage of the battery and a voltage of electronic equipment which receives power from the battery, and controls the charging switch or the discharging switch in accordance with the measured voltages.

According to another aspect of the present invention, there is provided a control method for a battery pack unit. The battery pack unit includes a rechargeable battery. A charging switch controls a charging of the battery. A discharging switch controls a discharging of the battery. A control circuit controls the charging switch or the discharging switch. The control method includes the step of measuring by the control circuit a voltage of the battery and a voltage of electronic equipment which receives power from the battery, and controlling the charging switch or the discharging switch in accordance with the measured voltages.

According to still another aspect of the present invention, there is provided a recording medium on which a program for controlling the above type of battery pack unit is recorded. The program includes the step of measuring a voltage of the battery and a voltage of electronic equipment which receives power from the battery, and controlling the charging switch or the discharging switch in accordance with the measured voltages.

According to a further aspect of the present invention, there is provided a battery pack unit including a rechargeable battery. A charging switch controls a charging of the battery. A discharging switch controls a discharging of the battery. A current detection circuit detects that a charging overcurrent, a discharging overcurrent, or a discharging current flows in the battery. A control circuit turns off the charging switch and turning on the discharging switch in a case where the battery pack unit is attached to electronic equipment, and turns on the charging switch in a case where a discharging current is detected by the current detection circuit.

According to a further aspect of the present invention, there is provided a control method for a battery pack unit. The battery pack unit includes a rechargeable battery. A charging switch controls a charging of the battery. A discharging switch controls a discharging of the battery. A current detection circuit detects that a charging overcurrent, a discharging overcurrent, or a discharging current flows in the battery. The control method includes the step of turning off the charging switch and turning on the discharging switch in a case where the battery pack unit is attached to electronic equipment, and turning on the charging switch in a case where a discharging current is detected by the current detection circuit.

According to a further aspect of the present invention, there is provided a recording medium on which a program for controlling above type of battery pack is recorded. The program includes a control step of turning off the charging switch and turning on the discharging switch in a case where the battery pack unit is attached to electronic equipment, and turning on the charging switch in a case where a discharging current is detected by the current detection circuit.

According to a further aspect of the present invention, there is provided a battery pack unit including a rechargeable battery. A charging switch controls a charging of the battery. A discharging switch controls a discharging of the battery. A current detection circuit detects that a charging overcurrent, a discharging overcurrent, or a charging current flows in the battery. A control circuit turns on the charging switch and turns off the discharging switch in a case where the battery pack unit is attached to electronic equipment, and turns on the discharging switch in a case where a charging current is detected by the current detection circuit.

According to a further aspect of the present invention, there is provided a control method for a battery pack unit. The battery pack unit includes a rechargeable battery. A charging switch controls a charging of the battery. A discharging switch controls a discharging of the battery. A current detection circuit detects that a charging overcurrent, a discharging overcurrent, or a charging current flows in the battery. The control method includes the control step of turning on the charging switch and turning off the discharging switch in a case where the battery pack unit is attached to electronic equipment, and turning on the discharging switch in a case where a charging current is detected by the current detection circuit.

According to a further aspect of the present invention, there is provided a recording medium on which a program for controlling the above type of battery pack is recorded. The program includes the control step of turning on the charging switch and turning off the discharging switch in a case where the battery pack unit is attached to electronic equipment, and turning on the discharging switch in a case where a charging current is detected by the current detection circuit.

According to a further aspect of the present invention, there is provided a battery pack unit including a rechargeable battery. A charging switch controls a charging of the battery. A discharging switch controls a discharging of the battery. A current detection circuit detects that a charging overcurrent, a discharging overcurrent, a charging current, or a discharging current flows in the battery. A control circuit turns on one of the charging switch and the discharging switch and turns off the other switch in a case where the battery pack unit is attached to electronic equipment, and turns on the turned-off charging switch or the turned-off discharging switch in a case where a discharging current or a charging current is detected by the current detection circuit. The control circuit further changes degrees of detection sensitivity between a charging overcurrent and a discharging overcurrent.

According to a further aspect of the present invention, there is provided a control method for a battery pack unit. The battery pack unit includes a rechargeable battery. A charging switch controls a charging of the battery. A discharging switch controls a discharging of the battery. A current detection circuit detects that a charging overcurrent, a discharging overcurrent, a charging current, or a discharging current flows in the battery. The control method includes the control step of turning on one of the charging switch and the discharging switch and turning off the other switch in a case where the battery pack unit is attached to electronic equipment, turning on the turned off charging switch or the turned off discharging switch in a case where a discharging current or a charging current is detected by the current detection circuit, and changing degrees of detection sensitivity between a charging overcurrent and a discharging overcurrent.

According to a further aspect of the present invention, there is provided a recording medium on which a program for controlling the above type of battery pack unit is recorded. The program includes the control step of turning on one of the charging switch and the discharging switch and turning off the other switch in a case where the battery pack unit is attached to electronic equipment, turning on the turned off charging switch or the turned off discharging switch in a case where a discharging current or a charging current is detected by the current detection circuit, and changing degrees of detection sensitivity between a charging overcurrent and a discharging overcurrent.

According to a yet further aspect of the present invention, there is provided electronic equipment connected to a battery pack unit and driven by power supplied from the battery back unit. The battery pack unit includes a rechargeable battery. A charging switch controls a charging of the battery. A discharging switch controls a discharging of the battery. A control circuit measures a voltage of the battery and a voltage of the electronic equipment and controls the charging switch or the discharging switch in accordance with the measured voltages.

According to a yet further aspect of the present invention, there is provided electronic equipment connected to a battery pack unit and driven by power supplied from the battery back unit. The battery pack unit includes a rechargeable battery. A charging switch controls a charging of the battery. A discharging switch controls a discharging of the battery. A current detection circuit detects that a charging overcurrent, a discharging overcurrent, or a discharging current flows in the battery. A control circuit turns off the charging switch and turns on the discharging switch in a case where the battery pack unit is attached to the electronic equipment. The control circuit turns on the charging switch in a case where a discharging current is detected by the current detection circuit.

According to a yet further aspect of the present invention, there is provided electronic equipment connected to a battery pack unit and driven by power supplied from the battery back unit. The battery pack unit includes a rechargeable battery. A charging switch controls a charging of the battery. A discharging switch controls a discharging of the battery. A current detection circuit detects that a charging overcurrent, a discharging overcurrent, or a discharging current flows in the battery. A control circuit turns off the charging switch and turns on the discharging switch in a case where the battery pack unit is attached to the electronic equipment. The control circuit turns on the discharging switch in a case where a charging current is detected by the current detection circuit.

According to a yet further aspect of the present invention, there is provided electronic equipment connected to a battery pack unit and driven by power supplied from the battery back unit. The battery pack unit includes a rechargeable battery. A charging switch controls a charging of the battery. A discharging switch controls a discharging of the battery. A current detection circuit detects that a charging overcurrent, a discharging overcurrent, or a discharging current flows in the battery. A control circuit turns on one of the charging switch and the discharging switch and turns off the other switch in a case where the battery pack unit is attached to the electronic equipment, and turns on the turned off charging switch or the turned off discharging switch in a case where a discharging current or a charging current is detected by the current detection circuit. The control circuit changes degrees of detection sensitivity between a charging overcurrent and a discharging overcurrent.

DETAILED DESCRIPTION OF THE PREFERRED EMBODIMENTS

Figure 2:
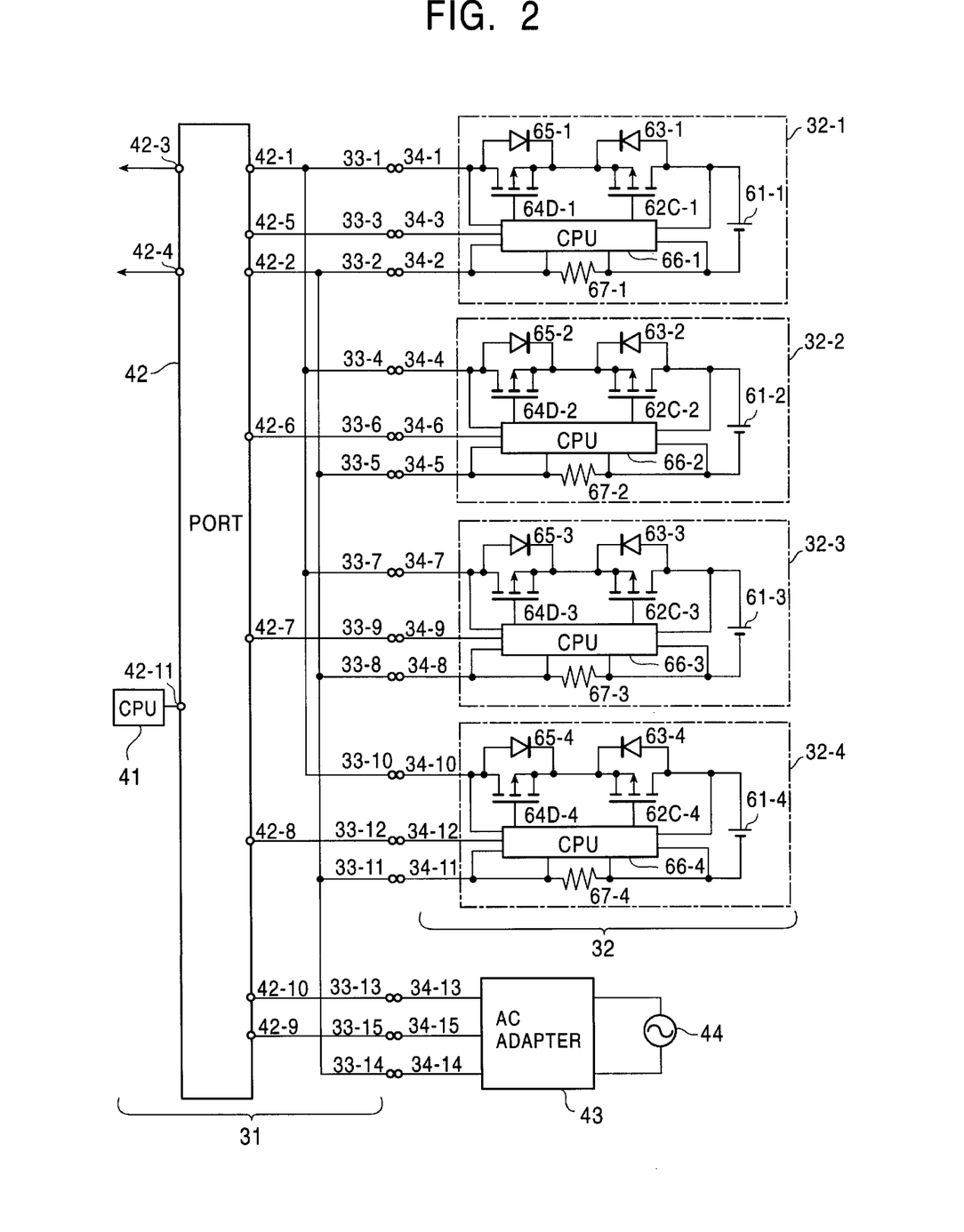
FIG. 2 is a circuit diagram illustrating the configuration of a battery pack unit and a personal computer according to the present invention.

FIG. 2 illustrates a battery pack unit according to a first embodiment of the present invention. In the first embodiment, a plurality of battery packs (four in this embodiment) 32-1 through 32-4 and an AC adapter 43 are detachably attached to a personal computer 31. It should be noted that the personal computer 31 is only partially shown. The battery pack 32-1 has not only a positive power supply terminal 34-1 and a negative power supply terminal 34-2, but also a terminal 34-3 through which signals are input and output (signal input/output terminal). The personal computer 31 is provided with terminals 33-1 through 33-3, which are respectively connected to the terminals 34-1 through 34-3 when the battery pack 32-1 is attached. The terminals 33-1, 33-2 and 33-3 are respectively connected to terminals 42-1, 42-2, and 42-5 provided for a port 42.

Similarly, the battery pack 32-2 has power supply terminals 34-4 and 34-5 and a signal input/output terminal 34-6. The battery pack 32-3 has power supply terminals 34-7 and 34-8 and a signal input/output terminal 34-9. The battery pack 32-4 has power supply terminals 34-10 and 34-11 and a signal input/output terminal 34-12. The personal computer 31 is provided with terminals 33-4 through 33-12 corresponding to the above terminals 34-4 through 34-12 of the battery pack unit 32.

The power supply terminals 33-4, 33-7 and 33-10 for the personal computer 31 are connected in common to the terminal 33-1, while the power supply terminals 33-5, 33-8, 33-11, and 33-14 are connected in common to the terminal 33-2.

The AC adapter 43 has not only a positive power supply terminal 34-13 and a negative power supply terminal 34-14, but also a signal input/output terminal 34-15. The personal computer 31 is provided with the terminals 33-13 through 33-15, which are respectively connected to the terminals 34-13 through 34-15 when the AC adapter 43 is attached. Further, the terminal 33-13 is connected to a terminal 42-10 provided for the port 42. The signal input/output terminals 33-6, 33-9, 33-12, and 33-15 are respectively connected to terminals 42-6, 42-7, 42-8, and 42-9 for the port 42.

The AC adapter 43 converts AC power from an AC power supply 44 into DC power and supplies it to the personal computer 31 and to the battery packs 32-1 through 32-4.

The port 42 is provided with terminals 42-3 and 42-4 through which power supplied from the terminals 42-1 and 42-2 is fed to the individual elements of the personal computer 31. The port 42 is also provided with a terminal 42-11 through which a CPU 41 is connected. The CPU 41 outputs a signal to the port 42 via the terminal 42-11 so that it transmits the signal to one of the battery packs 32-1 through 32-4 or the AC adapter 43 via the terminals 42-5 through 42-9, respectively, or receives power from the corresponding battery pack or the AC adapter 43.

The battery pack 32-1 has a rechargeable battery (secondary cell) 61-1. The positive terminal of the battery 61-1 is connected to the terminal 34-1 via a series circuit which is formed of a charge-control FET (a voltage drop transistor) 62C-1 and a discharge-control FET 64D-1. The FET 62C-1 and the FET 64D-1 have parasitic diodes 63-1 and 65-1, respectively. The negative terminal of the battery 61-1 is connected to the terminal 34-2 via a current detecting resistor 67-1.

A CPU (control circuit) 66-1 detects a voltage across the terminals 34-1 and 34-2 and a voltage across the battery 61-1. The CPU 66-1 also detects a current flowing in the battery 61-1 (the resistor 67-1) according to the voltage across the resistor 67-1. Then, the CPU 66-1 switches on or off the FET 62C-1 or the FET 64D-1 in accordance with the voltage across the terminals 34-1 and 34-2 and the terminal voltage across the battery 61-1, thereby protecting the battery 61-1.

The CPU 66-1 is also capable of switching on or off the FET 62C-1 or the FET 64D-1 in accordance with the signal input from an external source via the terminal 34-3.

The foregoing configuration of the battery pack 32-1 also applies to the battery packs 32-2 through 32-4. The elements of the battery packs 32-2 through 32-4 corresponding to those of the battery pack 32-1 are indicated by adding −2, −3 or −4 to the corresponding reference numerals.

Figure 3:
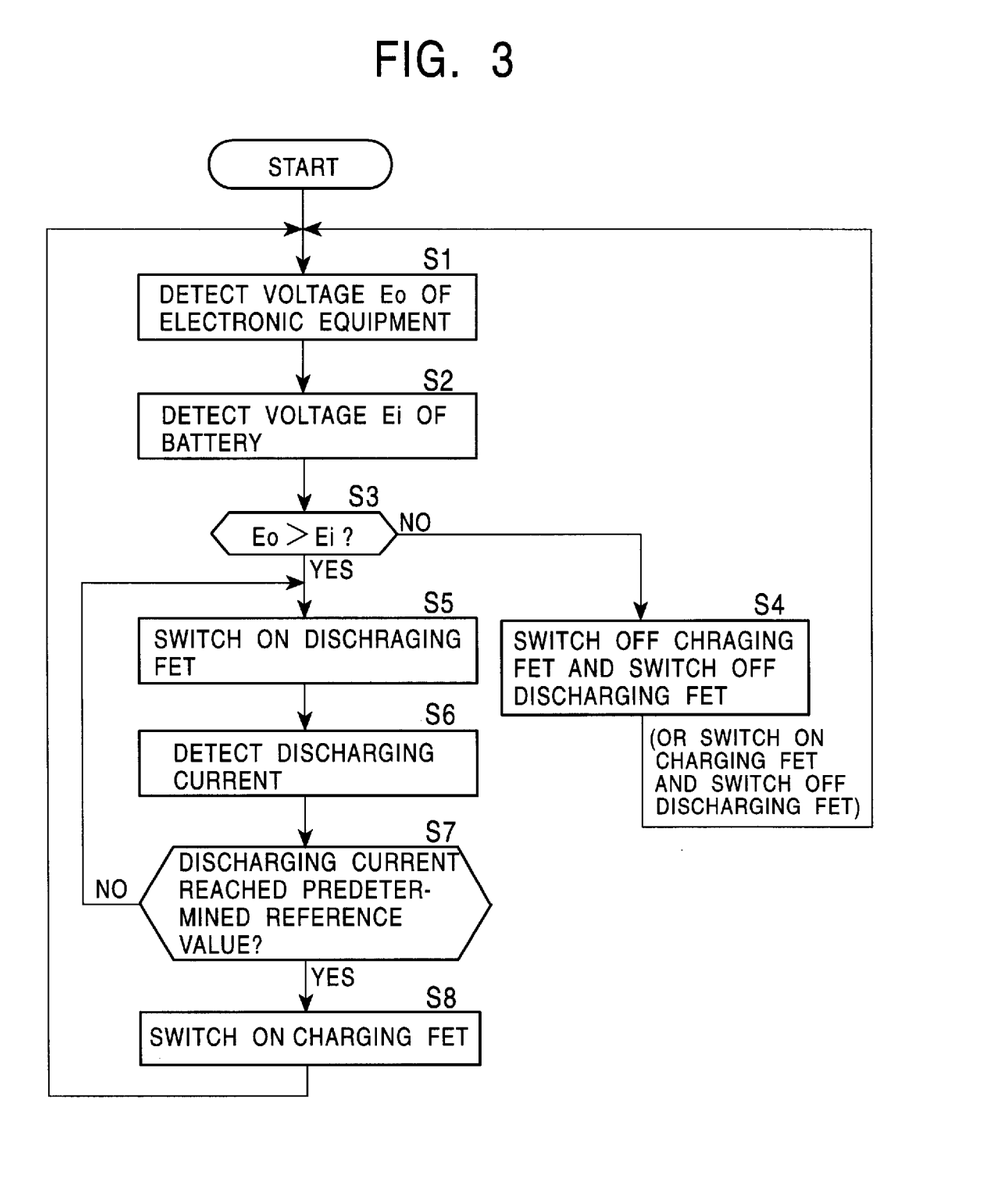
FIG. 3 is a flow chart illustrating the operation of a battery pack unit according to a first embodiment of the present invention.

The operation of the battery pack unit of the first embodiment constructed as described above is described below with reference to the flow chart of FIG. 3.

When the AC adapter 43 is connected to the personal computer 31, the CPU 41 outputs a control signal to the AC adapter 43 via the terminals 42-11, 42-9, 33-15, and 34-15 and causes it to supply power via the terminals 34-13, 33-13, 42-10, 42-3, 42-4, 42-2, 33-14, and 34-14.

Conversely, when the AC adapter 43 is not connected, power is supplied to the personal computer 31 from the battery pack 32-i (i represents 1, 2, 3 or 4). In this case, the CPU 66-i of the battery pack 32-i executes the processing represented by the flow chart of FIG. 3.

In the interests of simplicity, it is now assumed that two battery packs, i.e., the battery pack 32-1 having a lower voltage and the battery pack 32-2 having a higher voltage, are attached to the personal computer 31. In step S1, the CPU 66-2 of the battery pack 32-2 detects a voltage $E_o$ across the terminals 34-4 and 34-5. In step S2, the CPU 66-2 detects a terminal voltage $E_i$ across the battery 61-2.

In step S3, the CPU 66-2 then compares the voltage $E_o$ with the terminal voltage $E_i$. Since the voltage of the battery 61-2 is higher than that of the battery 61-1, the voltage $E_o$ is equivalent to or smaller than the voltage $E_i$, i.e., $E_o \leq E_i$. Thus, the CPU 66-2 proceeds to step S4 in which both FET 64D-2 and FET 62C-2 are switched off, or the FET 64D-2 is turned off and the FET 62C-2 is turned on. The above states of the battery pack are referred to as the "STOP" mode (both FET 64D-2 and FET 62C-2 are switched off) and the "c-Passive" mode (the FET 64D-2 is switched off and the FET 62C-2 is switched on), respectively. The CPU 66-2 then returns to step S1 and the foregoing processing is repeated.

In the battery pack 32-2, since the parasitic diode 65-2 of the FET 64D-2 is inserted in the reverse direction to the discharging current, the discharging current from the battery 61-2 is blocked when the FET 64D-2 is switched off. Accordingly, the discharging current is blocked in the battery pack which is in the "c-Passive" mode. In contrast, since the parasitic diode 63-2 of the FET 62C-2 is inserted in the reverse direction to the charging current, the charging current to the battery 61-2 is interrupted when the FET 62C-2 is switched off. Accordingly, both discharging current and charging current are blocked in the battery pack which is in the "STOP" mode.

Conversely, in the battery pack 32-1, since the voltage of the battery 61-1 is lower than that of the battery 61-2, it is determined in step S3 that the voltage $E_o$ is greater than the voltage $E_i$, i.e., $E_o > E_i$. The CPU 66-1 thus proceeds to step S5 in which the FET 64D-1 is switched on and the FET 62C-1 is switched off. Such a state of the battery pack is referred to as the "d-Passive" mode.

Since the parasitic diode 63-1 of the FET 62C-1 is inserted in the reverse direction to the charging current, the charging current to the battery 61-1 is interrupted when the FET 62C-1 is switched off. Thus, the charging current is blocked in the battery pack which is in the "d-Passive" mode. However, since the parasitic diode 63-1 of the FET 62C-1 is inserted in the forward direction to the discharging current, the discharging current flows in the battery 61-1 and is supplied to the terminal 34-1.

In the foregoing state, power is supplied to the personal computer 31 from the battery pack 32-1.

While power is being supplied to the personal computer 31, the CPU 41 of the personal computer 31 instructs the CPU 66-i (i.e., the CPUs 66-1 and 66-2) of the battery pack 32-i (i.e., the battery packs 32-1 and 32-2) to detect the voltage of the battery 61-i (i.e., the batteries 61-1 and 61-2). In response to this instruction, the CPU 66-1 detects the voltage of the battery 61-1 and notifies it to the CPU 41. Likewise, the CPU 66-2 detects the voltage of the battery 61-2 and notifies it to the CPU 41. A detailed description of this operation is given below with reference to the flow chart of FIG. 5.

In this manner, the CPU 41 receives information from the two battery packs 32-1 and 32-2 and detects that the voltage of the battery 61-2 of the battery pack 32-2 is higher than that of the battery 61-1 of the battery pack 32-1. The CPU 41 then instructs the battery pack 32-1 having a lower voltage to be set in the "d-Passive" mode and confirms the setting. The CPU 41 also instructs the battery pack 32-2 having a higher voltage to enter the "Active" mode in which both FET 62C-2 and FET 64D-2 are activated. In response to this instruction, the CPU 66-2 switches on both FET 62C-2 and FET 64D-2 to start the discharging operation. The power supply operation can thus be switched from the battery pack 32-1 having a lower voltage to the battery pack 32-2 having a higher voltage.

When both FET 64D-2 and FET 62C-2 of the battery pack 32-2 are activated, neither the discharging current from the battery 61-2 nor the charging current to the battery 61-2 is blocked. In other words, neither the discharging current nor the charging current is interrupted in the battery pack 32-2, which is in the "Active" mode.

The battery pack 32-2 supplies power to the individual elements of the personal computer 31 via the battery 61-2, the FET 62C-2, FET 64D-2, the terminals 34-4, 33-4, 42-1, 42-3, 42-4, 42-2, 33-5, and 34-5, and the resistor 67-2 in the given order.

Figure 4:
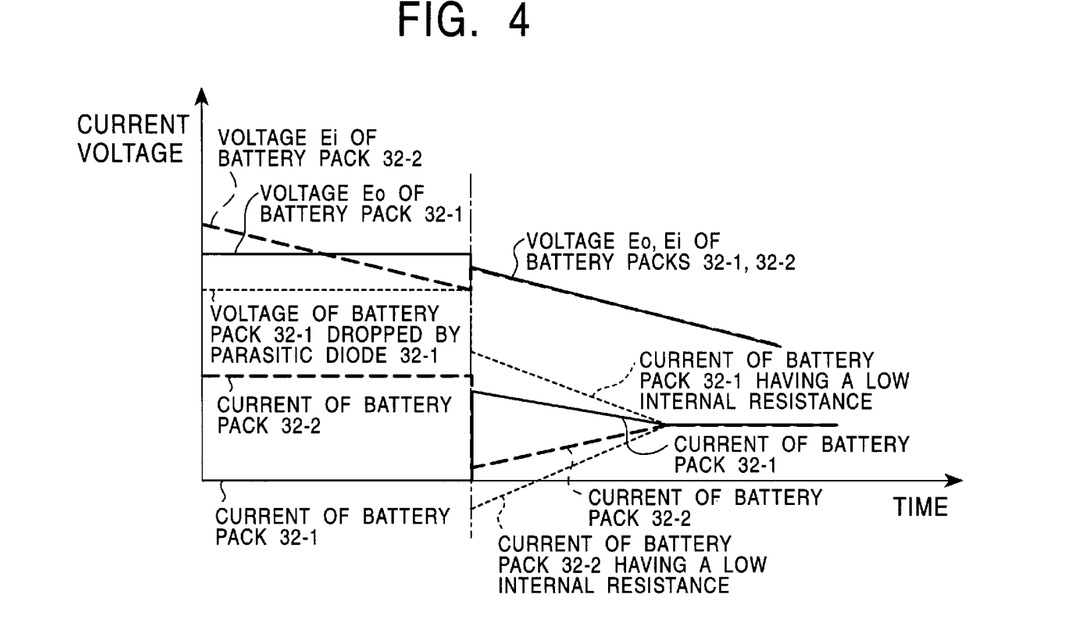
FIG. 4 is a diagram illustrating the operation of connecting two battery packs in parallel to each other according to the configuration shown in FIG. 2.

As is seen from FIG. 4, since the battery 61-2 is supplying power, the terminal voltage (i.e., the output voltage $E_o$) of the battery 61-2 is gradually reduced with the passage of time. In contrast, since the battery pack 32-1 is not discharging, the terminal voltage $E_i$ of the battery 61-1 is substantially maintained at a constant voltage.

The actual voltage output from the battery pack 32-1 is lower than the terminal voltage $E_i$ of the battery 61-1 by an amount equal to a voltage drop of the parasitic diode 63-1. Thus, when the output voltage $E_o$ of the battery 61-2 becomes substantially equal to the voltage output from the battery pack 32-1 with the passage of time, the discharging current commences to flow from the battery pack 32-1. At this time, the CPU 66-1 detects the discharging current of the battery 61-1, as indicated in step S6 of the flow chart of FIG. 3.

If the battery pack 32-1 is in the "d-Passive" mode, i.e., the discharging current flows in the battery pack 32-1, the discharging current passes through the parasitic diode 63-1 since the FET 62C-1 is turned off. In order to avoid power loss caused by the resistance of the parasitic diode 63-1, the CPU 66-1 first determines in step S7 whether the discharging current is greater than a predetermined reference value. If the answer of step S7 is yes, the CPU 66-1 proceeds to step S8 in which the FET 62C-1 of the battery pack 32-1 is switched on (the battery pack 32-1 is set in the "Active" mode).

According to the foregoing operation, the batteries 61-1 and 61-2 are automatically connected in parallel to each other (not by the control of the CPU 41) and perform simultaneous discharging. The discharging current of the battery 61-2 sharply drops and then starts to gently increase. Conversely, the discharging current of the battery 61-1 sharply rises and then starts to gently decrease. If the battery packs 32-1 and 32-2 have a lower internal resistance, the above degree of increase or decrease is greater, and the battery 61-2 is charged during a certain period.

When the discharging current of the battery 61-1 becomes equal to that of the battery 61-2, the discharging current continues to flow while remaining at the same level. Although the terminal voltages $E_o$ and $E_i$ of the batteries 61-1 and 61-2 are substantially the same level, they are gradually lowered with the passage of time.

The battery pack 32-1 is set in the "Active" mode only after the terminal voltage of the battery 61-1 becomes equal to that of the battery 61-2. This is because of the following reason. If the battery pack 32-1 is set in the "Active" mode while the terminal voltages of the batteries 61-1 and 61-2 are still different, the battery 61-1 having a lower terminal voltage is unfavorably charged from the battery 61-2 having a higher terminal voltage.

However, both terminal voltages are not required to be exactly the same but may be only substantially equal to each other. Namely, for example, if the internal resistance (r) of each battery pack is 200 mΩ, and the maximum permissible current ($I_{max}$) is 2 A, the voltage difference ΔV between the battery packs can be allowed up to 0.8 V (=0.4 V×2). This permissible voltage difference ΔV can be determined by $I_{max}$×2r. If the battery packs are changed for power supply when the voltage difference between the battery packs exceeds this permissible voltage difference ΔV, a current in excess of the maximum permissible current ($I_{max}$) flows in the battery packs.

The permissible voltage difference ΔV is more specifically explained. If power supply is changed, for example, from a battery pack having a higher voltage to a battery pack having a lower voltage, while a charging current (Ic) flows in the battery packs, the permissible voltage difference ΔV is also expressed by the equation: ΔV=$I_{max}$×2r. In contrast, if power supply is changed from, for example, a battery pack having a higher voltage to a battery pack having a lower voltage, while a discharging current (Id) flows in the battery packs, the permissible voltage difference ΔV is expressed by the equation: ΔV=($I_{max}$−Id)×2r. Further, if power supply is changed from, for example, a battery pack having a lower voltage to a battery pack having a higher voltage, while a charging current (Ic) flows in the battery packs, the permissible voltage difference ΔV can be expressed by the equation: ΔV=($I_{max}$−Ic)×2r.

If the CPU 66-1 determines in step S7 that the discharging current is smaller than a predetermined reference value, it returns to step S5 in which the discharging current is detected.

Subsequent to step S5 in which the battery pack 32-1 is set in the "d-Passive" mode, the voltage $E_o$ and the terminal voltage $E_i$ may be detected in step S6. Then, if it is determined in step S7 that both voltages are equal to each other, the FET 62C-1 may be turned on in step S8.

A description is given below of the case where the battery packs are controlled from an external source with reference to the flow chart of FIG. 5.

Figure 6:
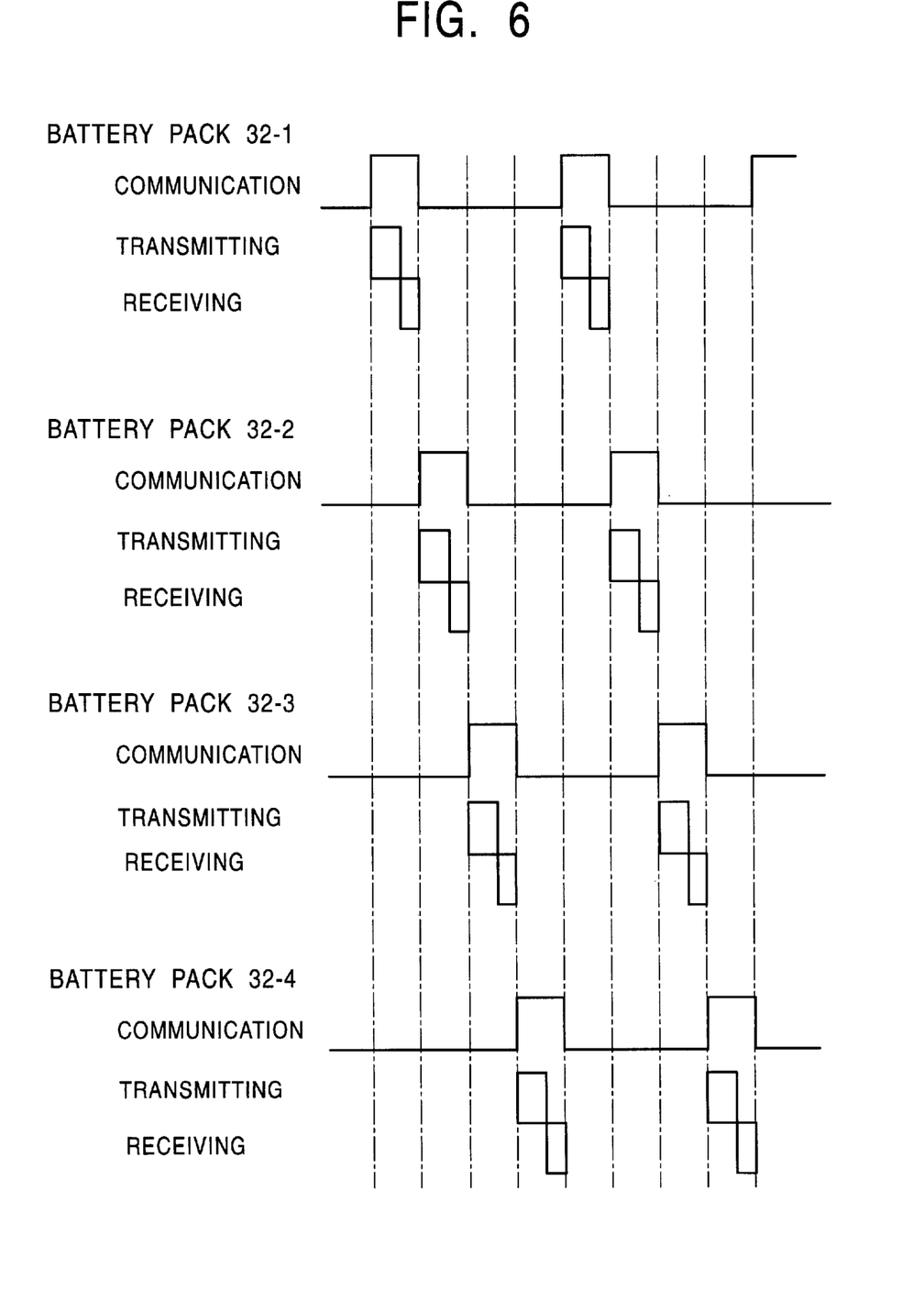
FIG. 6 is a timing chart illustrating the communication between the battery pack unit of the present invention and a personal computer.

The CPU 41 communicates with the individual CPUs 66-1 through 66-4 of the battery packs 32-1 through 32-4. Various communication techniques may be employed, and, in this embodiment, communication is performed by using a time-sharing technique, as illustrated in FIG. 6. The CPU 41 transmits a signal to the battery pack (for example, see the state of the battery pack 32-1 shown in FIG. 6) when the levels of the corresponding communication lines (for example, the terminals 42-5, 33-3, and 34-3) are high, i.e., "H", and receives information concerning the state of the battery pack. While the CPU 41 performs transmitting and receiving with the particular battery pack, the levels of the communication lines (for example, the terminals 42-6, 33-6, and 34-6) connected to another battery pack (for example, see the state of the battery pack 32-2 shown in FIG. 6) are set to be low, i.e., "L", thereby preventing communication with that battery pack.

It should be noted that the level of the communication lines when the communication is not performed may be set to be "H", and the level of the communication lines at which communication is performed may be set to be "L" in correspondence with the data.

It is now assumed that the CPU 41 instructs the battery pack 32-1 to enter the "Active" mode. This instruction is transmitted to the battery pack 32-1 via the terminals 42-11, 42-5, 33-3, and 34-3.

Figure 5:
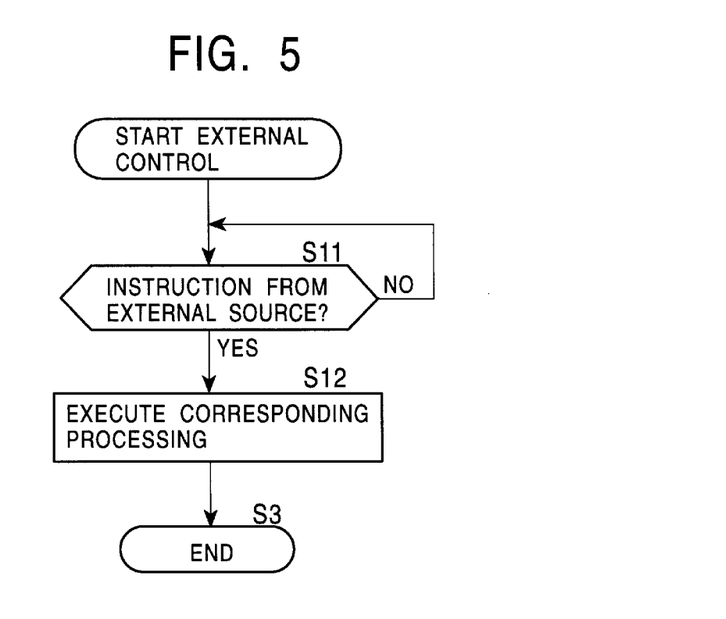
FIG. 5 is a flow chart illustrating the processing of the battery pack unit of the present invention when controlled by an external source.

Referring back to the flow chart of FIG. 5, in step S11, the CPU 66-1 of the battery pack 32-1 waits for an instruction from the CPU 41. If an instruction is provided from the CPU 41 in step S11, the CPU 66-1 proceeds to step S12 in which both FET 64D-1 and FET 62C-1 are actuated ("Active" mode).

As noted above, the CPU 66-1 of the battery pack 32-1 receives an instruction indicating one of the modes "Active", "d-Passive", "c-Passive", and "STOP" and switches on or off the FET 64D-1 and the FET 62C-1 in accordance with the instruction. Similarly, the CPUs 66-2 through 66-4 each receive from the CPU 41 an instruction representing one of the above modes and switch on or off the FETs 64D-2 through 64D-4 and the FETs 62C-2 through 62C-4 in accordance with the instruction.

The operation for charging the battery packs is as follows.

When the AC adapter 43 is connected to the personal computer 31 (power is supplied from the AC power supply 44 to the individual elements of the personal computer 31 via the terminals 34-13, 33-13, 42-10, 42-3, 42-4, 42-2, 33-14, and 34-14), the CPU 41 causes the battery pack having the lowest terminal voltage to be charged. It is now assumed that the battery packs 32-2 through 32-4 are set in the "Active" mode and thus simultaneously supply power to the personal computer 31, and the battery pack 32-1 having the lowest voltage is in the "d-Passive" mode. The CPU 41 first outputs a signal and requests a response from the AC adapter 43 via the terminals 42-11, 42-9, 33-15, and 34-15.

Upon receiving a response from the AC adapter 43 (when the AC adapter 43 is attached to the computer 31), the CPU 41 sequentially instructs the CPUs 66-1 through 66-4 to report their states (i.e., the terminal voltages of the batteries). The CPU 41 then detects that the terminal voltage of the battery 61-1 of the battery pack 32-1 is lower than the terminal voltages of the batteries 61-2 through 61-4 of the other battery packs 32-2 through 32-4.

Subsequently, the CPU 41 instructs the battery packs 32-2 through 32-4 to enter the "STOP" mode. Namely, only the battery pack 32-1 is maintained in the "d-Passive" mode. As a consequence, even if the AC adapter 43 is detached from the personal computer 31, the discharging current from the battery pack 32-1 is maintained.

In the present invention, charging is sequentially performed on the batteries starting from the battery having the lowest voltage. Thus, the CPU 41 instructs the CPU 66-1 to switch on both FET 64D-1 and FET 62C-1 (in the "Active" mode). Then, the battery 61-1 is charged via the terminals 34-13, 33-13, 42-10, 42-1, 33-1, 34-1, the FET 64D-1, the FET 62C-1, the battery 61-1, the resistor 67-1, and the terminals 34-2, 33-2, 33-14, and 34-14.

In the above charging operation, the battery packs 32-2 through 32-4 may be set in the "c-Passive" mode rather than the "STOP" mode. In this case, as the charging of the battery pack 32-1 proceeds and when the terminal voltage of the battery pack 32-1 becomes higher than the terminal voltages of the battery packs 32-2 through 32-4, the charging current flows into the battery packs 32-2 through 32-4. Therefore, the FET 62C-2 through the FET 62C-4 are turned on (i.e., the "c-Passive" mode) when a charging current greater than a predetermined reference value flows in the battery pack 32-1. Then, simultaneous charging is automatically performed on the battery packs 32-2 through 32-4.

The CPUs 66-1 through 66-4 of the battery packs 32-1 through 32-4 are also capable of protecting the battery packs from overcharging and overdischarging. The control operation of protecting from overcharging and overdischarging is described below with reference to the flow chart of FIG. 7.

Figure 7:
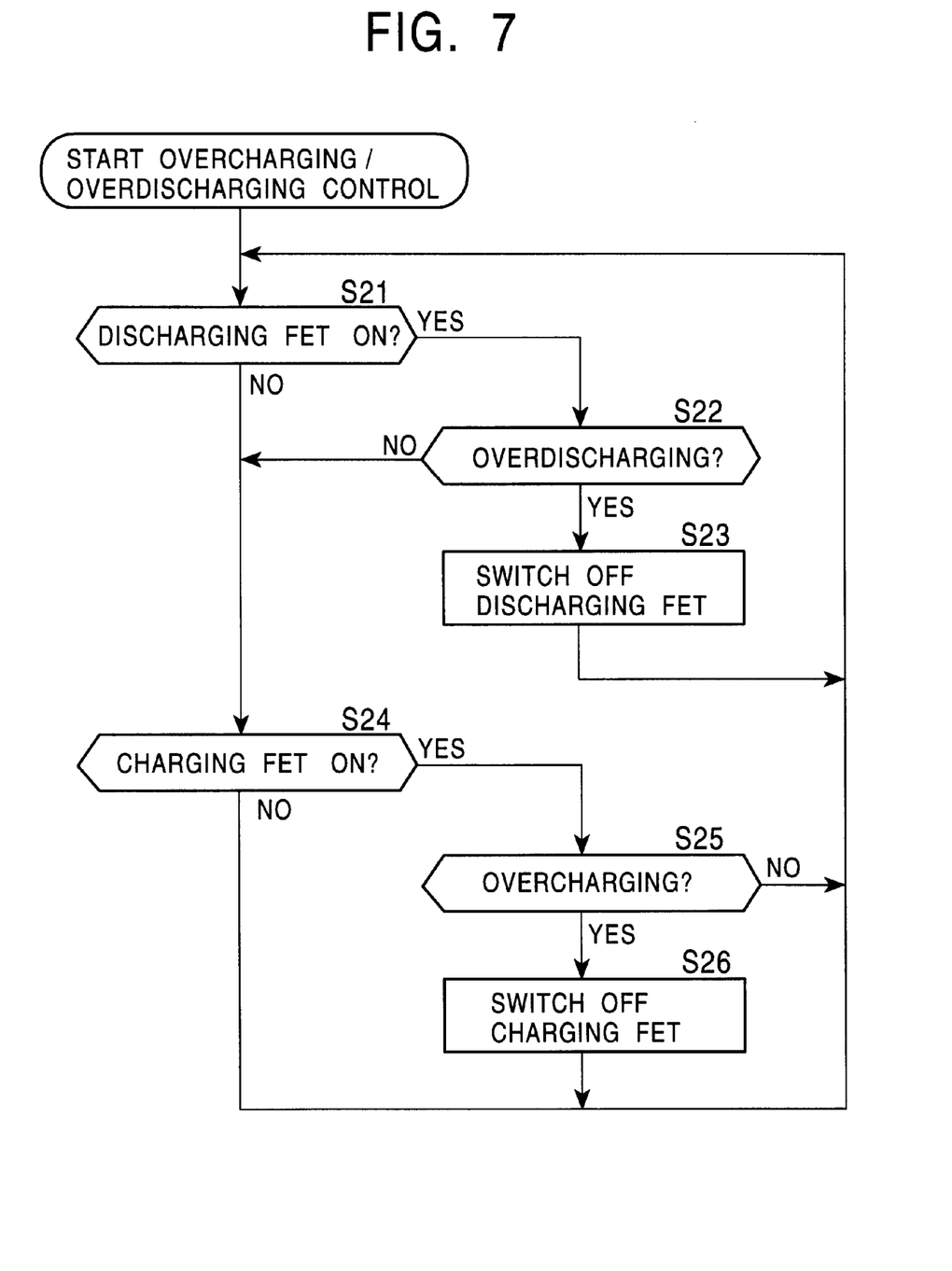
FIG. 7 is a flow chart illustrating the overcharging/overdischarging control operation of the battery pack unit of the present invention.

For example, the CPU 66-1 of the battery pack 32-1 determines in step S21 whether the FET 64D-1 is activated (i.e., whether the battery pack 32-1 is being discharged). If the answer of step S21 is no (i.e., the battery pack 32-1 is not being discharged), the CPU 66-1 proceeds to step S24. If the CPU 66-1 judges in step S21 that the FET 64D-1 is activated (i.e., the battery pack 32-1 is being discharged), the CPU 66-1 proceeds to step S22 in which it makes a determination of whether the battery 61-1 is being excessively discharged by detecting the terminal voltage of the battery 61-1 or the voltage across the resistor 67-1. When overdischarging is detected in step S22, the CPU 66-1 proceeds to step S23 in which it switches off the FET 64D-1. If overdischarging is not detected in step S22, the CPU 66-1 proceeds to step S24 in which it starts the control operation of protecting from overcharging.

As discussed above, the parasitic diode 65-1 of the FET 64D-1 is inserted in the reverse direction to the discharging current. Accordingly, if the FET 64D-1 is switched off, the discharging current from the battery 61-1 is blocked. This protects the battery 61-1 from being damaged due to over-discharging.

In step S24, the CPU 66-1 makes a determination of whether the FET 62C-1 is activated (i.e., whether the battery pack 32-1 is being charged). If the answer of step S24 is no (i.e., if the battery pack 32-1 is not being charged), the CPU 66-1 returns to step S21 in which it again starts the control operation of protecting from overcharging and overdischarging. On the other hand, if the CPU 66-1 judges in step S24 that the FET 62C-1 is switched on, it proceeds to step S25. In step S25, the CPU 66-1 detects the terminal voltage of the battery 61-1 or the voltage across the resistor 67-1 and determines whether the terminal voltage of the battery 61-1 has reached a saturated charging voltage or whether an overcharging current flows in the battery 61-1, i.e., whether the battery 66-1 is being excessively charged. If overcharging is detected in step S25, the CPU 66-1 proceeds to step S26 in which the FET 62C-1 is switched off. If overcharging is not detected in step S25, the CPU 66-1 returns to step S21 in which it again starts the control operation of protecting from overcharging and overdischarging.

As noted above, the parasitic diode 63-1 of the FET 62C-1 is inserted in the reverse direction to the charging current. Thus, when the FET 62C-1 is switched off, the charging current to the battery 61-1 is interrupted. It is thus possible to protect the battery 61-1 from being damaged due to overcharging.

A second embodiment of the present invention is now described below. The configuration of the second embodiment is similar to that of the first embodiment, and only the operation thereof is thus described with reference to the flow chart of FIG. 8.

In the second embodiment, as well as in the first embodiment, for the purpose of brevity, it is assumed that two battery packs, i.e., the battery pack 32-1 having a lower voltage and the battery pack 32-2 having a higher voltage, are attached to the personal computer 31. Referring to the flow chart of FIG. 8, in step S41, the CPU 66-2 detects the voltage $E_o$ across the terminals 34-4 and 34-5. The CPU 66-2 then detects the terminal voltage $E_i$ of the battery 61-2 in step S42.

Figure 8:
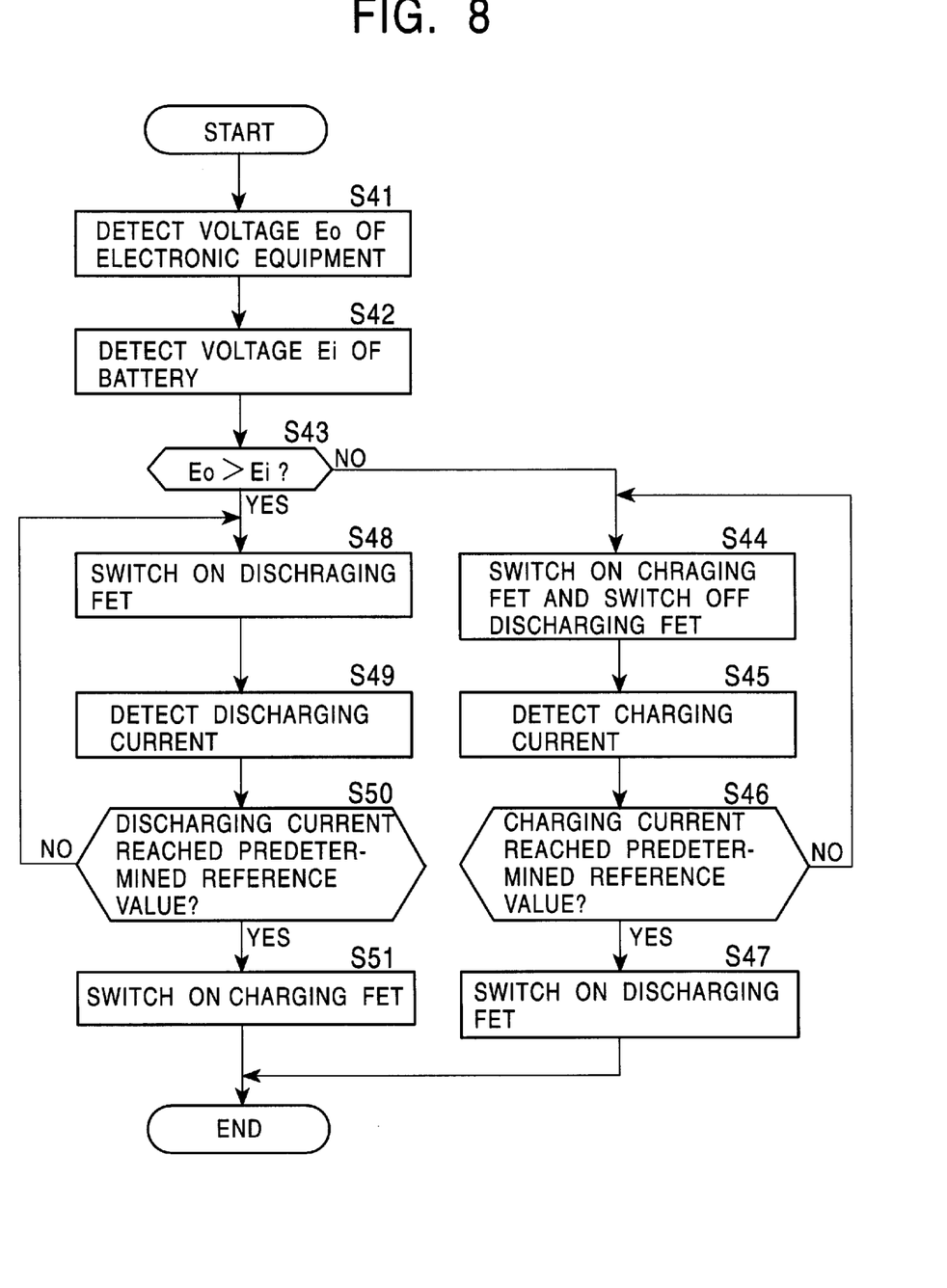
FIG. 8 is a flow chart illustrating the operation of a battery pack unit according to a second embodiment of the present invention.

Subsequently, in step S43, the CPU 66-2 compares the output voltage $E_o$ with the terminal voltage $E_i$. If the voltage $E_o$ is equivalent to or smaller than the voltage $E_i$, i.e., $E_o \leq E_i$, the CPU 66-2 proceeds to step S44 in which it switches off the FET 64D-2 and switches on the FET 62C-2 (the battery 62-2 enters the "c-Passive" mode).

In step S45, the CPU 66-2 detects the charging current to the battery 61-2. The CPU 66-2 then determines in step S46 whether the charging current has reached a predetermined reference value. If the answer of step S46 is yes, it proceeds to step S47 in which it turns on the FET 64D-2 (the battery 62-2 enters the "Active" mode). If the CPU 66-2 judges in step S46 that the charging current is smaller than the predetermined reference value, it returns to step S44 and continues to detect the charging current.

In contrast, if the CPU 66-2 determines in step S43 that the voltage $E_o$ is greater than the voltage $E_i$, i.e., $E_o > E_i$, it proceeds to step S48 in which it switches on the FET 64D-1 and switches off the FET 62C-1 (the battery 61-1 is set in the "d-Passive" mode).

In step S49, the CPU 66-1 detects the discharging current of the battery 61-1, and in step S50, the CPU 66-1 makes a determination of whether the discharging current has reached a predetermined reference value. If the answer of step S50 is yes, the CPU 66-1 proceeds to step S51 in which it activates the FET 62C-1 of the battery pack 32-1 (the battery 61-1 is set in the "Active" mode).

On the other hand, if the CPU 66-1 determines in step S50 that the discharging current is smaller than the predetermined reference value, it returns to step S48 and continues to detect the discharging current.

In the second embodiment, as well as in the previous embodiment, the CPU 41 controls the battery pack 32-2 having a higher voltage in such a manner that it sets the battery pack 32-2 in the "Active" mode to cause it to perform discharging. When the output voltage of the battery pack 32-2 becomes equal to that of the battery pack 32-1, the battery packs 32-1 and 32-2 automatically perform simultaneous discharging.

As in the first embodiment, the CPU 41 controls the CPUs 66-1 and 66-2 of the respective battery packs 32-1 and 32-2 so that the discharging starts from the battery pack having a higher voltage and the charging starts from the battery pack having a lower voltage.

A third embodiment of the present invention is described below. Since the configuration of the third embodiment is similar to that of the first embodiment, only the operation thereof is described with reference to the flow chart of FIG. 9.

Figure 9:
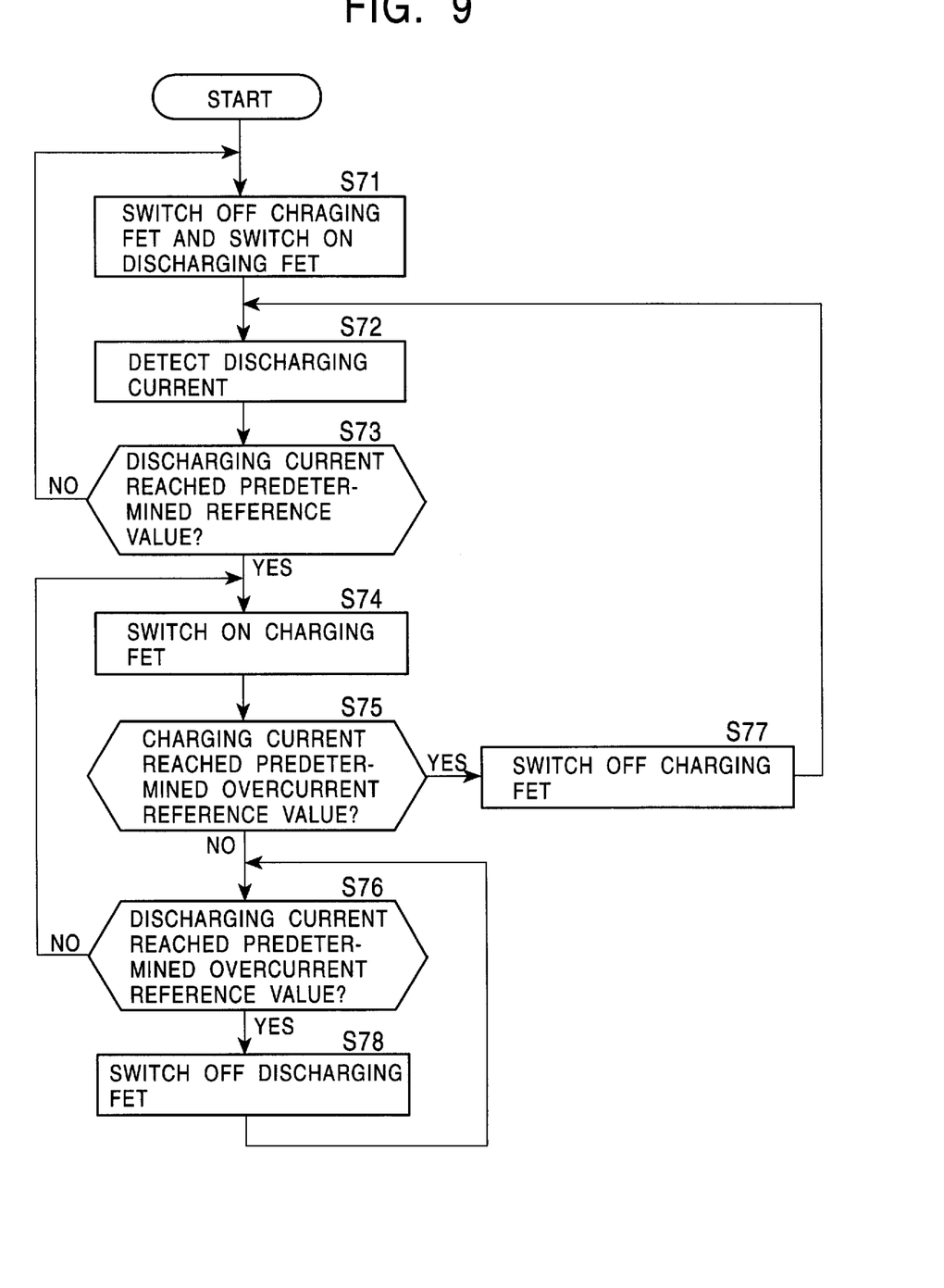
FIG. 9 is a flow chart illustrating the operation of a battery pack unit according to a third embodiment of the present invention.

In step S71, when a battery pack is attached to the personal computer 31, the CPU of the battery pack switches off the charging FET and switches on the discharging FET so that the battery pack enters the "d-Passive" mode. It is now assumed that the battery pack 32-1 has been attached to the personal computer 31 and is supplying power. In this state, if the battery pack 32-2 having a higher voltage than the battery pack 32-1 is newly attached to the personal computer 31, the FET 62C-2 is turned off and the FET 64D-2 is turned on in step S71.

In step S72, the CPU 66-2 detects the discharging current of the battery 61-2. Since the battery 61-2 has a higher voltage than the battery 61-1, the discharging current flows from the battery pack 32-2 to the battery pack 32-1. The CPU 66-2 then determines in step S73 whether the discharging current is greater than a predetermined reference value (a comparatively small and normal reference value for detecting whether the discharging current flows). If the answer of step S73 is yes, the CPU 66-2 proceeds to step S74 in which it activate the FET 62C-2 of the battery pack 32-2 (the battery pack 32-2 enters the "Active" mode).

At this time, the charging current flows from the battery pack 32-2 to the battery pack 32-1 having a lower voltage since the battery pack 32-1 is in the "Active" mode. Thus, the CPU 66-1 of the battery pack 32-1 determines in step S75 whether the charging current is equivalent to or greater than a predetermined reference value (a comparatively large overcurrent reference value, such as the rated maximum value). If the answer of step S75 is yes (i.e., the charging overcurrent flows in the battery pack 32-1), the CPU 66-1 proceeds to step S77 in which the FET 62C-1 is switched off (the battery pack 32-1 is set in the "d-Passive" mode). Then, the battery 61-1 is prevented from being charged by the battery 61-2. Also, since the output voltage of the battery pack 32-2 is higher than that of the battery pack 32-1, the discharging from the battery pack 32-1 is automatically stopped.

In this manner, without being provided with an instruction from the CPU 41, the discharging operation is automatically switched from the battery pack 32-1 to the battery pack 32-2 having a higher voltage.

Meanwhile, the charging current of the battery pack 32-1 is discharged from the battery pack 32-2. Then, the CPU 66-2 of the battery pack 32-2 determines in step S76 whether the discharging current has reached a predetermined reference value (for example, a discharging overcurrent reference value greater than the normal reference value used in step S73, such as the rated maximum value). If the answer of step S76 is no, the CPU 66-2 returns to step S74, and the "Active" mode is maintained. Namely, both the battery packs 32-2 and 32-1 are concurrently discharged.

If it is detected in step S76 that the discharging current has reached the predetermined overcurrent reference value, the CPU 66-2 proceeds to step S78 in which it switches off the FET 64D-2.

It should be noted that the charging overcurrent detection (step S75) is operated with a higher sensitivity than the discharging overcurrent detection (step S76). For example, the charging overcurrent reference value is set smaller than the discharging overcurrent reference value, and also, the period required for the former determination is set shorter than that for the latter determination. This makes it possible to switch off the FET 62C-1 of the battery pack 32-1 earlier than the FET 64D-2 of the battery pack 32-2, thereby reliably switching the power supply from the battery pack 32-1 to the battery pack 32-2.

As the voltage of the battery 61-2 is reduced with the passage of time and finally becomes substantially the same as the voltage of the battery 61-1, the discharging current flows from the battery 61-1 since the FET 64D-1 is activated. The discharging current from the battery 61-1 is then detected and compared in steps S72 and S73. If the answer of step S73 is yes, the CPU 66-1 switches on the FET 62C-1 in step S74 to set the battery pack 32-1 in the "Active" mode. Accordingly, the batteries 61-1 and 61-2 are connected in parallel to each other and simultaneously supply power to the personal computer 31.

If it is determined in step S73 that the discharging current is smaller than the normal reference value, the CPU 66-1 of the battery pack 31-1 returns to step S71 in which the "d-Passive" mode is maintained.

In this embodiment illustrated in FIG. 9, when the discharging current reaches the normal reference value in step S73, the charging FET is activated in step S74. As in the first embodiment shown in FIGS. 3 and 4, however, the voltages $E_o$ and $E_i$ may be compared, and when both voltages are equal to each other, the charging FET may be switched on.

The foregoing discharging control operation performed by the overcurrent detection may apply to the charging control operation. In this case, the battery pack in which a discharging overcurrent flows is set in the "c-Passive" mode.

It is now assumed that the battery pack 32-1 having a lower voltage is attached while the battery pack 32-2 having a higher voltage is being charged. In this case, the battery pack 32-1 is set in the "c-Passive" mode when it is attached. Since the battery pack 32-1 having a lower voltage is newly attached while the battery pack 32-2 is being charged, the battery back 32-2 commences to supply the discharging current to the battery pack 32-1. At this time, if a discharging overcurrent which has reached a predetermined reference value is detected, the battery pack 32-2 switches off the FET 64D-2 to enter the "c-Passive" mode. In contrast, since the charging overcurrent which has reached the reference value flows in the battery pack 32-1, the FET 64D-1 is activated (in the "Active" mode) and the battery pack 32-1 is charged. Namely, without being provided with an instruction from the CPU 41, the charging operation is automatically switched from the battery pack 32-2 having a higher voltage to the battery pack 32-1 having a lower voltage.

The degrees of sensitivity of the charging overcurrent detection and the discharging overcurrent detection are reversed to those in the above-described discharging control operation. That is, the discharging overcurrent detection is operated with a higher sensitivity than the charging overcurrent detection. This makes it possible to smoothly switch the charging operation from the battery pack 32-2 to the battery pack 32-1.

According to the foregoing overcurrent detection, it is unnecessary for the CPU 41 to detect the voltage of each battery pack. Moreover, each battery pack does not necessarily compare its own voltage with the terminal voltage. Therefore, the foregoing discharging control operation may apply to battery packs having an unintelligent and simple configuration. The unintelligent battery packs do not usually have communication lines, in which case, in place of communication lines, control lines may be provided in such a manner that the battery packs are set at the "H" level during charging and at the "L" level during discharging.

The overcurrent detecting functions and the associated charging/discharging control switches, which are provided for the battery packs in the foregoing embodiments, may be provided for the personal computer 31.

Further, although in the foregoing embodiments, four battery packs are provided, any number of two or more battery packs may be provided. Moreover, battery packs may be attached to any type of electronic equipment other than personal computers, such as hand-held video cameras, mobile cellular telephones, and audio-visual equipment.

Additionally, although specific battery packs are used as examples in the foregoing embodiments, any battery pack selected from a plurality of battery packs may be employed to carry out the embodiments.

As is seen from the foregoing description, the present invention offers the following advantages.

In one form of the invention, the voltage of a battery and the voltage of electronic equipment are measured within a battery pack, and a charging switch or a discharging switch is controlled in accordance with the measured voltages. Accordingly, power can be supplied to the electronic equipment without needing to provide a specific circuit for the electronic equipment.

In another form of the present invention, when a battery pack unit is attached to electronic equipment, a charging switch is turned off and a discharging switch is turned on. Upon detecting a discharging current, the charging switch is turned on. It is thus possible to supply power to the electronic equipment by changing the battery packs without requiring the control of the electronic equipment.

In still another form of the present invention, when a battery pack unit is attached to electronic equipment, a charging switch is turned on and a discharging switch is turned off. Upon detecting a charging current, the discharging switch is turned on. It is thus possible to alternately charge the battery packs without requiring the control of the electronic equipment.

In a further form of the present invention, when a battery pack unit is attached to electronic equipment, one of the charging switch and the discharging switch is turned on, and the other switch is turned off. Upon detecting a discharging current or a charging current, the turned off switch is then turned on. Moreover, the degrees of detection sensitivity are changed between a charging overcurrent and a discharging overcurrent. Consequently, charging and discharging can be reliably controlled without needing the control of the electronic equipment.

What is claimed is:

1. A battery pack unit comprising:
    a rechargeable battery;
    a charging switch for controlling a charging of said battery;
    a discharging switch for controlling a discharging of said battery; and
    a control circuit for measuring a voltage of said battery and a voltage of electronic equipment which receives power from said battery, and for controlling said charging switch or said discharging switch in accordance with the measured voltages, said control circuit turning on said discharging switch when the voltage of said electronic equipment is higher than the voltage of said battery, said control circuit turning on said charging switch when the voltage of said electronic equipment is lower than the voltage of said battery.

2. A battery pack unit comprising:
    a rechargeable battery;
    a charging switch for controlling a charging of said battery;
    a discharging switch for controlling a discharging of said battery; and
    a control circuit for measuring a voltage of said battery and a voltage of electronic equipment which receives power from said battery, and for controlling said charging switch or said discharging switch in accordance with the measured voltages, said control circuit turning on said discharging switch when the voltage of said electronic equipment is higher than the voltage of said battery.

3. A battery pack unit according to claim 2, wherein said control circuit further comprises discharging current detection means for detecting whether a discharging current flowing from said battery is equal to or greater than a predetermined value, and said control circuit turns on said charging switch while said discharging switch is on in a case where said discharging current detection means detects that the discharging current flowing from said battery is equal to or greater than the predetermined value.

4. A battery pack unit comprising:
    a rechargeable battery;
    a charging switch for controlling a charging of said battery;
    a discharging switch for controlling a discharging of said battery; and
    a control circuit for measuring a voltage of said battery and a voltage of electronic equipment which receives power from said battery, and for controlling said charging switch or said discharging switch in accordance with the measured voltages, said control circuit turning on said charging switch when the voltage of said electronic equipment is lower than the voltage of said battery.

5. A battery pack unit according to claim 4, wherein said control circuit further comprises charging current detection means for detecting whether a charging current flowing to said battery is equal to or greater than a predetermined value, and said control circuit turns on said discharging switch while said charging switch is on in a case where said charging current detection means detects that the charging current flowing to said battery is equal to or greater than the predetermined value.

6. A battery pack unit according to claim 1, wherein said control circuit turns on said charging switch in a case where the voltage of said electronic equipment becomes substantially equal to the voltage of said battery in the state in which said discharging switch is on and said charging switch is off.

7. A battery pack unit according to claim 1, wherein said control circuit turns on said discharging switch in a case where the voltage of said electronic equipment becomes substantially equal to the voltage of said battery in the state in which said charging switch is on and said discharging switch is off.

8. A battery pack unit comprising:
    a rechargeable battery;
    a charging switch for controlling a charging of said battery;
    a discharging switch for controlling a discharging of said battery;
    a current detection circuit for detecting that a charging overcurrent, a discharging overcurrent, or a discharging current flows in said battery; and
    a control circuit for turning off said charging switch and turning on said discharging switch when said battery pack unit is attached to electronic equipment, and for turning on said charging switch when a discharging current is detected by said current detection circuit, said current detection circuit detecting a charging overcurrent with a higher sensitivity than a discharging overcurrent.

9. A battery pack unit comprising:
    a rechargeable battery;
    a charging switch for controlling a charging of said battery;
    a discharging switch for controlling a discharging of said battery;
    a current detection circuit for detecting that a charging overcurrent, a discharging overcurrent, or a charging current flows in said battery; and a control circuit for turning on said charging switch and turning off said discharging switch when said battery pack unit is attached to electronic equipment, and for turning on said discharging switch when a charging current is detected by said current detection circuit, said current detection circuit detecting a discharging overcurrent with a higher sensitivity than a charging overcurrent.

10. A battery pack unit comprising:

a rechargeable battery;

a charging switch for controlling a charging of said battery;

a discharging switch for controlling a discharging of said battery;

a current detection circuit for detecting that a charging overcurrent, a discharging overcurrent, a charging current, or a discharging current flows in said battery; and a control circuit for turning on one of said charging switch and said discharging switch and turning off the other switch in a case where said battery pack unit is attached to electronic equipment, and for turning on the turned-off charging switch or the turned-off discharging switch in a case where a discharging current or a charging current is detected by said current detection circuit, and for changing degrees of detection sensitivity between a charging overcurrent and a discharging overcurrent.

11. A control method for a battery pack unit, said battery pack unit comprising:

a rechargeable battery;

a charging switch for controlling a charging of said battery;

a discharging switch for controlling a discharging of said battery; and a current detection circuit for detecting that a charging overcurrent, a discharging overcurrent, a charging current, or a discharging current flows in said battery, said control method comprising the control step of turning on one of said charging switch and said discharging switch and turning off the other switch in a case where said battery pack unit is attached to electronic equipment, turning on the turned off charging switch or the turned off discharging switch in a case where a discharging current or a charging current is detected by said current detection circuit, and changing degrees of detection sensitivity between a charging overcurrent and a discharging overcurrent.

12. A recording medium on which a program for controlling a battery pack unit is recorded, said battery back unit comprising:

a rechargeable battery;

a charging switch for controlling a charging of said battery;

a discharging switch for controlling a discharging of said battery; and a current detection circuit for detecting that a charging overcurrent, a discharging overcurrent, a charging current, or a discharging current flows in said battery, said program comprising the control step of turning on one of said charging switch and said discharging switch and turning off the other switch in a case where said battery pack unit is attached to electronic equipment, turning on the turned off charging switch or the turned off discharging switch in a case where a discharging current or a charging current is detected by said current detection circuit, and changing degrees of detection sensitivity between a charging overcurrent and a discharging overcurrent.

13. Electronic equipment connected to a battery pack unit and driven by power supplied from said battery back unit, said battery pack unit comprising:

a rechargeable battery;

a charging switch for controlling a charging of said battery;

a discharging switch for controlling a discharging of said battery;

a current detection circuit for detecting that a charging overcurrent, a discharging overcurrent, or a discharging current flows in said battery; and a control circuit for turning on one of said charging switch and said discharging switch and turning off the other switch in a case where said battery pack unit is attached to said electronic equipment, and for turning on the turned off charging switch or the turned off discharging switch in a case where a discharging current or a charging current is detected by said current detection circuit, and for changing degrees of detection sensitivity between a charging overcurrent and a discharging overcurrent.

* * * * *